United States Patent [19]

Munson

[11] 4,385,207
[45] May 24, 1983

[54] LINE POWERED TRANSFORMERLESS LOUDSPEAKING TELEPHONE

[75] Inventor: Verne E. Munson, Brielle, N.J.

[73] Assignee: Bell Telephone Laboratories, Inc., Murray Hill, N.J.

[21] Appl. No.: 182,439

[22] Filed: Aug. 29, 1980

[51] Int. Cl.³ .............................................. H04M 1/60
[52] U.S. Cl. ........................... 179/81 B; 179/170 NC
[58] Field of Search ............... 179/1 HF, 1 VC, 81 B, 179/81 R, 81 A, 170 NC, 170 T

[56] References Cited

U.S. PATENT DOCUMENTS

| | | | |
|---|---|---|---|
| 3,725,585 | 4/1973 | Moniak et al. | 179/1 HF |
| 3,987,254 | 10/1976 | Pipitone | 179/81 B |
| 4,303,805 | 12/1981 | Synek et al. | 179/81 R |

*Primary Examiner*—Joseph A. Popek
*Attorney, Agent, or Firm*—David H. Tannenbaum

[57] ABSTRACT

A line powered loudspeaking telephone is implemented entirely from electronic components, eliminating inductors and transformers. A three stage (521, 523, 525, 532) output amplifier is used with the loudspeaker impedance forming the output stage impedance. A feedback network (527, 528, 529, 530) is used between the amplifier input and output stages to provide the desired gain at audio frequencies while forcing the DC gain to unity. The circuit then functions to provide proper gain for audio frequency signals received from the communication line while reflecting onto the communication line the resistive component of the output stage impedance scaled by biasing circuit elements (518, 519) of the amplifier input stage, thereby maintaining the proper voltage-current characteristic of the communication line.

9 Claims, 4 Drawing Figures

LINE POWERED TRANSFORMERLESS LOUDSPEAKING TELEPHONE

FIELD OF THE INVENTION

This invention relates to transformerless circuitry for coupling impedances to a telephone communication line and more particularly to such an arrangement for use in a loudspeaking telephone.

BACKGROUND OF THE INVENTION

Loudspeaking, or hands-free telephones, have achieved widespread acceptance in the commercial environment. Such telephones are convenient for conducting multi-party conversations when several people are gathered in one office. Another particularly convenient feature of the loudspeaking telephone is that the user may converse without actually being in contact with the telephone, except possibly to initially answer an incoming call.

Typically, such loudspeaking, or as they are also called, speakerphone, telephones require a source of power to control the internal logic as well as to drive the loudspeaker. In addition, such telephones employ inductors and transformers in order to balance the impedance between the telephone line and the loudspeaker. This unbalance condition results because loudspeakers are inherently low impedance devices while the telephone line requires a much higher impedance for proper power transfer. It follows then that problems arise in situations where it is desired to utilize the convenience of a speakerphone at a low cost, without bulky inductors or transformers and without external power. These problems are compounded when it is remembered that as loop length changes the line impedance as well as the available power changes.

SUMMARY OF THE INVENTION

I have designed a transformerless loudspeaking telephone using the impedance of the loudspeaker reflected onto the communication line to control the power curve of the communication loop. I have arranged a feedback circuit coupled with a biasing network in the input stage of the output power amplifier to reflect onto the communication line the loading resistance of the amplifier output stage as a function of the circuit elements. This is accomplished by a biasing circuit which scales the output resistance operating in conjunction with a feedback circuit which maintains the DC gain at unity. The feedback circuit also controls the AC gain so that power is available to drive the speaker when audio frequencies appear on the line. Thus, the power drain from the line is constant. Using this arrangement the speaker is driven directly from the output stage transistor without the use of transformers.

BRIEF DESCRIPTION OF THE DRAWING

The operation of my transformerless loudspeaking telephone set will be more fully appreciated from a review of the embodiment shown in the drawing in which.

GENERAL DESCRIPTION

Figure 1:
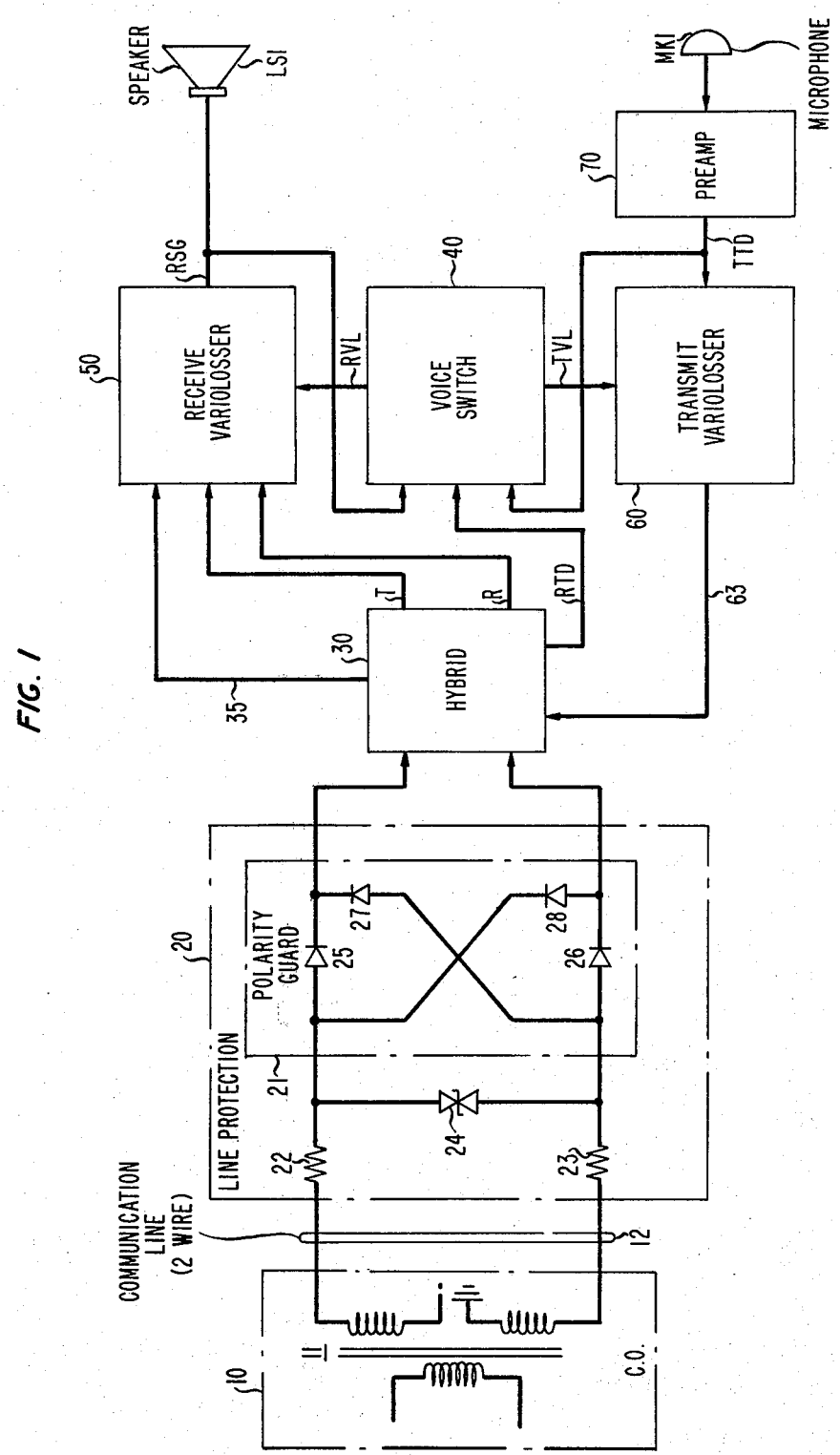
FIG. 1 shows a block diagram of the overall system and FIGS. 2, 3 and 4 show a schematic of the various circuit components shown in FIG. 1.

As shown in FIG. 1, communication from the central office 10 is via communication line 12 to the loudspeaking station set which has typically at its input line protection 20. The signal on the communication leads from the central office is provided to hybrid 30 and via received variolosser 50 is provided to loudspeaker LS1. Audio from a talker is received via microphone MK1 and passed through preamp 70 in transmit variolosser 60 to hybrid 30 and back over the communication leads 12 to the central office 10. Voice switch 40 monitors the signal levels from receive variolosser 50 and also from transmit variolosser 60, and based on these signals as well as signals from hybrid 30 their input to loudspeaker LS1 serves to control the direction of communication either to loudspeaker LS1 or from microphone MK1. The precise manner in which this is accomplished will be more fully detailed hereinafter.

Line protection circuit 20 is arranged with diode 24 which limits the voltage to 17.6 volts maximum and is designed to limit high voltage surges. Polarity guard 21 utilizes four Schottky barrier diodes 25, 26, 27 and 28, to insure proper voltage polarity to hybrid 30.

DETAILED DESCRIPTION

Figure 2:
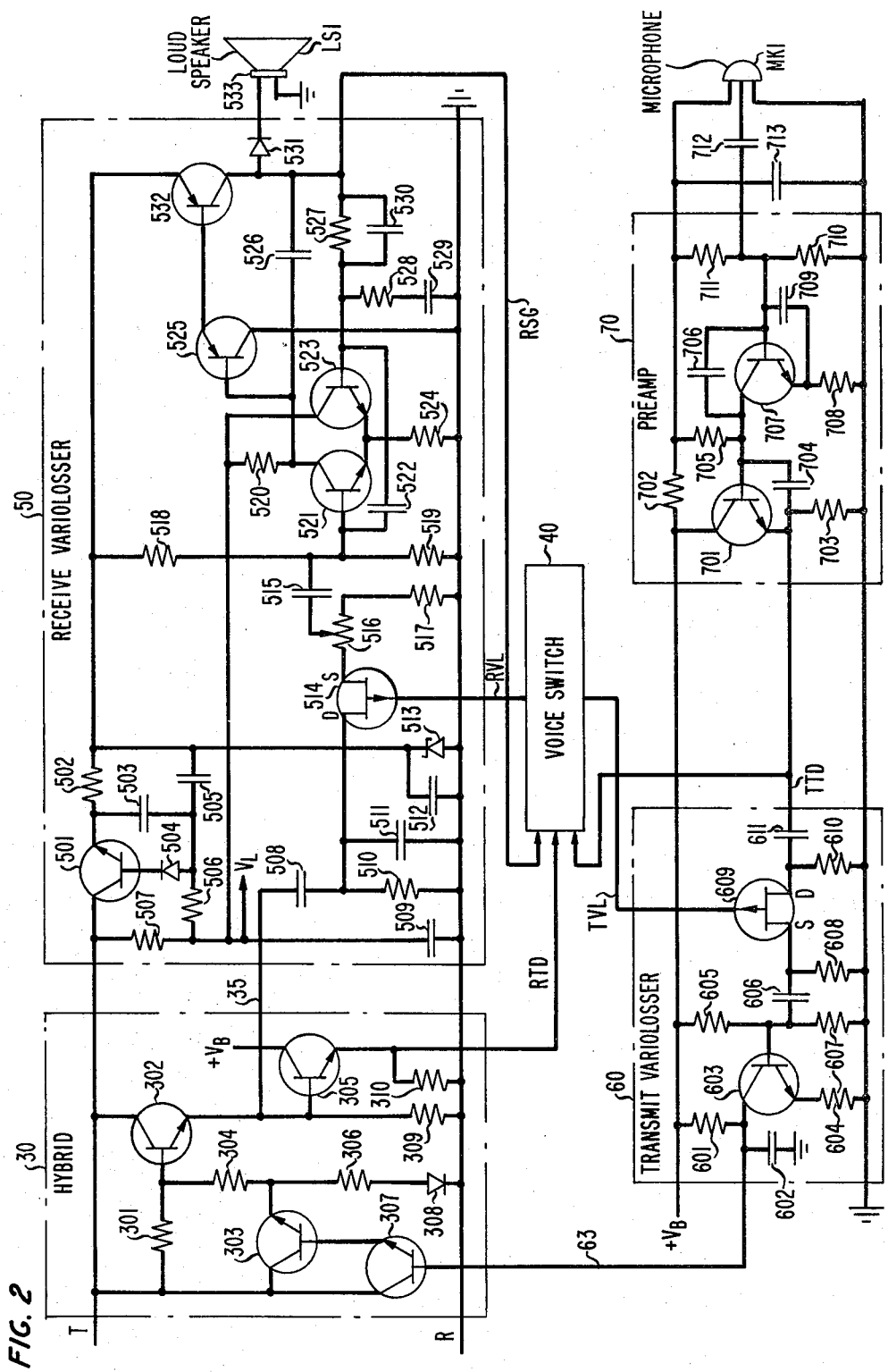

Turning now to FIG. 2, microphone MK1 is an electret transducer which provides an input to preamp 70 which amplifier contains voltage gain transistor 707 followed by emitter follower transistor 701. Capacitors 706, 709 and 704 provide radio frequency interference protection. Resistor 702 and capacitor 713 provide power supply voltage filtering. Preamp 70 is designed to provide a nominal 19.5 db of gain.

Transmit signals from preamp 70 are supplied via lead TTD, to voice switch 40 and to transmit variolosser 60. The operation of voice switch 40 will be discussed hereinafter. Transmit signals at the input of transmit variolosser 60 are AC coupled, via capacitor 611 to JFET transistor 609, which is used as a voltage controlled variable resistor. Signals are provided through transistor 609 and via capacitor 606 and amplifier transistor 603 over lead 63 to the base of transistor 307 in hybrid 30. Transmit variolosser 60 provides 11.5 db of voltage gain at 1000 Hz and capacitor 602 provides a pole at 3300 Hz for proper frequency response. Transmit signals applied to the base of transistor 307 are supplied to the CO line over the T and R lead communication path.

Hybrid 30 receives signals at the base of transistor 307 from transmit variolosser 60 and at the collectors of transistors 307 and 303 from the CO and receive variolosser 50. These signals are then provided to the base of transistor 302 through the voltage divider formed by resistors 301, 304 and 306. Transistor 302 is arranged as an emitter follower to transmit signals to receive variolosser 50. Transistors 303 and 307 in hybrid 30 are connected in a Darlington configuration and act as an amplifier for transmit signals. The gain of the amplifier is determined by the ratio of collector to emitter impedance. In this circuit the emitter impedance is resistor 306 in series with diode 308. The collector circuit impedance is determined by the receive circuit input impedance (as will be discussed hereinafter) in parallel with the telephone line impedance. Thus, as will be discussed, the transmit gain through the hybrid is dependent upon line termination.

The transhybrid loss from the base of transistor 307 to the base of transistor 302 is also dependent upon line termination. The signals at the emitter and collector of transistor 303 are transmitted to the base of transistor 302 with equal loss. In this arrangement the signals are 180 degrees out of phase and if the hybrid emitter impedance is matched to the collector circuit impedance, the signals cancel at the base of transistor 302. Thus, hybrid 30 effectively operates to prevent signals which originate at microphone MK1 (signals on lead 63) from being reproduced over loudspeaker LS1.

D.C. LINE TERMINATION

The d.c. line termination is provided by transistor 501 operating in a common base mode, which reflects back to the telephone line the d.c. resistance seen looking into the supply leads of the power amplifier. Base current for 501 is provided through resistors 507, 506, and diode 504. Diode 504 is used to regulate the voltage drop across 501, collector to emitter. This voltage drop is minimized to provide maximum available power to the power amplifier and to limit the power dissipation in 501, but must be large enough to ensure that 501 does not saturate for the maximum a.c. signals impressed upon its collector. Capacitor 503 provides RFI suppression and capacitor 512 acts as a filter capacitor for the power amplifier supply voltage.

The power amplifier supply current is drawn primarily by its output stage through transistor 532. The collector current of 532 is determined by its collector voltage which is applied across diode 531 and loudspeaker LS1. This voltage is determined by the power amplifier circuit, which is a feedback amplifier with a differential amplifier input stage consisting of transistors 521 and 523. D.C. feedback from the output stage to the input stage is provided by resistor 527. Therefore, the voltage at the collector of transistor 532 is equal to the voltage at the base of transistor 521 plus the small voltage drop across resistor 527 due to bias current, thus the feedback stabilizes the DC bias point, and the DC gain is unity. The voltage divider formed by resistors 518 and 519 determines the voltage at the base of transistor 521. Thus, the equivalent d.c. resistance seen at the power amplifier supply leads is given approximately by the total d.c. resistance of diode 531 and loudspeaker LS1 multipled by (1+518/519).

At high line currents, zener diode 513 limits the power amplifier supply voltage, thereby limiting the output power and the power dissipation in transistor 532. This circuit arrangement allows transistor 532 to be small, and low cost, and provides an acceptable output level for this application.

A.C. LINE TERMINATION

The a.c. impedance presented to the telephone line is determined primarily by the resistor 507 in series with capacitor 509. The a.c. impedance of the telephone line port of the hybrid circuit, which appears in parallel with resistor 507 and capacitor 509, is approximately 10.9 K ohms. An additional parallel impedance presented by the collector of transistor 501 is a function of the unwanted a.c. signal returned through transistor 501 emitter from the power amplifier supply leads. The attenuation of this returned signal is provided by the combined effect of resistors 502 and 506, and capacitor 505 on the a.c. gain of transistor 501 from emitter to collector. In the worst case (maximum volume control setting), the equivalent a.c. impedance of transistor 501 is approximately ten times the value of resistor 507.

Thus, the overall a.c. impedance presented to the telephone line is approximately 700Ω.

TRANSMISSION CONTROL

Transistor 514 and its associated components act as a variable loss circuit. Transistor 514 is a junction field-effect transistor (JFET) whose drain-to-source resistance is controlled by the d.c. voltage applied to its gate over lead RVL. Capacitors 508 and 515 couple the receive signal in and out of the receive variolosser circuit, respectively. Resistor 510 provides a d.c. path to ground from the drain of transistor 514 and resistors 516 and 517 provide a d.c. path to ground from the source of transistor 514. Resistor 516 is a potentiometer which also provides the volume control function. It has an audio taper in order to provide a fairly linear loss versus rotation characteristic. Resistor 517 limits the maximum loss end of the volume control range. Capacitor 511 provides RFI suppression.

POWER AMPLIFIER—OPERATION

Since the power amplifier of receive variolosser 50 derives its power from the telephone line, it performs the dual function of amplifying receive signals and determining the d.c. line termination, as previously discussed. The power amplifier is basically a three-stage feedback amplifier with a differential input stage, an emitter-follower intermediate stage, and a single-ended, common-emitter output stage.

Transistors 521 and 523 form the differential input stage with resistors 520 and 524. The bias for the base of transistor 521 is provided by the voltage divider formed by resistors 518 and 519. The bias of the base of transistor 523 is provided through feedback resistor 527. The gain of this stage is a function of bias current which determines the transconductance of transistors 521 and 523. In order to achieve sufficient open loop gain, the supply voltage for the first stage is taken from the junction of resistors 506 and 507. This supply voltage is higher than the supply voltage for the output stage allowing use of a higher bias current (more gain) for the input stage. In addition, the signal appearing on the output supply voltage is well-filtered from this supply eliminating an undesired feedback path. Capacitor 522 provides RFI suppression.

Transistor 525 acts as an emitter-follower in order to present a high load impedance to the first stage. Transistor 525 emitter voltage is connected directly to the base of transistor 532 which provides the common emitter output stage. Loudspeaker LS1, which can be arranged in the well-known manner with a coil impedance 533, to convert electrical signals to audio signals presents the dominant loading impedance on the output stage. This impedance includes both resistive and reactive components.

Resistors 528 and 527, and capacitors 529 and 530 form the feedback network for the power amplifier and thereby determine both the AC and DC closed-loop gain at maximum line current. At lower line currents, the closed-loop gain will be reduced slightly due to the resulting reduction in open-loop gain. The AC gain must be sufficient to drive the loudspeaker. This gain has a nominal value of 34 db at audio frequencies.

VOICE SWITCH—FUNCTION

As shown in FIG. 2, three inputs to the voice switch are taken from different points in the transmission paths: one (TTD) from the transmit preamplifier output, one (RTD) from the hybrid receive port, and one (RSG) from the power amplifier output. Two of these inputs (TTD and RTD) are used to determine which transmission path has the highest level signal and to switch loss into the appropriate path. The other input (RSG) is used to hold the circuit in the receive mode after a receive signal has been detected and loss has been switched out of the receive path. This input, as will be seen, prevents signals which are acoustically coupled from the receive path to the transmit path from switching the circuit to the transmit mode.

The switched loss is provided by transistor 514 in receive variolosser 50 and by transistor 609 in the transmit variolosser under control of outputs from the voice switch. The voice switch provides suitable thresholds and timing for the switching function.

The circuit is designed to be transmit idle, i.e., the quiescent mode (no transmission signals present for a long time) is the transmit mode (no loss in transmit path, high loss in receive path).

VOICE SWITCH—OPERATION

Figures 3, 4:
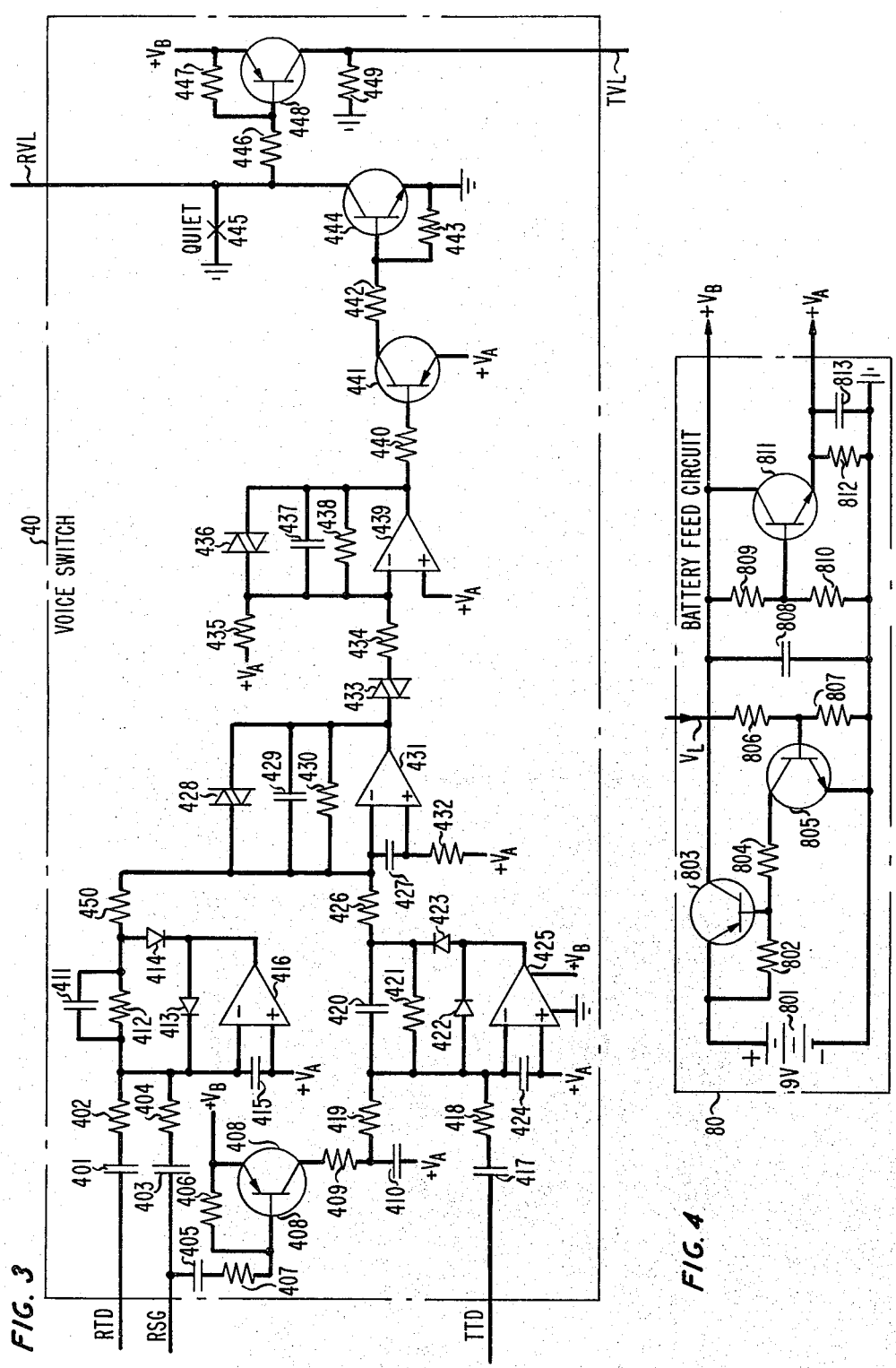

As shown in FIG. 3, signals over lead RSG (Receive Switch Guard) and lead RTD (Receive Talk-Down) are provided to op amp 416 to provide a control signal of negative polarity.

The RTD input is taken from the emitter of transistor 302 (FIG. 2) at the receive port of the hybrid circuit. Transistor 305 and resistor 310 provide an emitter-follower stage to buffer this input, providing a high impedance load to the receive path and isolating the RTD input from the RSG input. Capacitor 401 (FIG. 3) couples the receive signal into the op amp stage where the gain is determined by the ratio of resistor 402 to resistor 412. Capacitor 411 provides high frequency roll-off to improve the transmit lock-out margin. Diodes 413 and 414 in the feedback network of op amp 416 provide precision half-wave rectification of the signal. Capacitor 415 provides RFI suppression.

The RSG input is coupled from the power amplifier output (FIG. 2) by capacitor 403. The gain for this input is determined by the ratio of resistors 404 and 412. Signals are provided over lead TTD to op amp 425 to provide a signal of positive polarity. The TTD input is coupled from the transmit preamplifier output by capacitor 417. The gain for this signal is determined by the ratio of resistors 418 and 421.

The RSG input is coupled from the power amplifier output through capacitor 405 and resistor 407 to the base of transistor 408. Transistor 408 provides rectification and amplification of signals which exceed the base-emitter voltage. Resistor 406 ensures that transistor 408 is off when no receive signal is present. Resistor 409 and capacitor 410 in the collector circuit provide a low pass filter with a fast attack time. The d.c. voltage developed across capacitor 410 while a signal is present will then decay slowly through resistor 419 when the signal is removed. The positive polarity of the signal across capacitor 410 will reduce the effective signal from the TTD input by a factor determined by the ratio of resistors 419 and 418. Diodes 422 and 423 in the feedback network of op amp 425 provide precision half-wave rectification of the input signal. Capacitor 424 provides RFI suppression.

Op amp 431 and its associated components provide a comparison (linear addition) of the rectifier outputs and inverts, amplifies, and filters the sum of these signals. Note that the rectifier outputs via diodes 414 and 423 are of opposite polarity; thus the sum of these signals is equal to the difference in amplitudes. The comparator output will have a positive polarity if a receive signal is present and a negative polarity if a transmit signal is present. The rectifier signals are d.c. coupled through resistors 450 and 426 and the gain of the comparator circuit is determined by the ratio of these resistors to resistor 430. Varistor 428 limits the comparator output and capacitor 429 provides filtering so that the comparator output follows the envelope of a speech signal. Resistor 432 provides d.c. bias for the positive input terminal of the op amp.

Op amp 439 and its associated components provide detection of an input signal above a threshold determined by varistor 433. Resistors 438 and 434 determine the gain for the signal above this threshold. Capacitor 437 determines the attack and decay times of this circuit. Resistor 435 provides a d.c. path for the op amp bias current. Varistor 436 limits the output so that the op amp is not over-driven. The output of this circuit will have a negative polarity for a receive signal and a positive polarity for a transmit signal.

The detector output is applied through resistor 440 to the base of transistor 441 which provides a level shifting function. A receive signal produces a negative polarity detector output which turns transistor 441 on. The collector of transistor 441 is connected to the base of transistor 444 through resistor 442; therefore a receive signal will cause transistor 444 to turn on. Resistor 443 ensures that transistor 444 is off when there is no receive signal above threshold. The RVL lead control voltage, which is applied to the gate of transistor 514 (FIG. 2) is taken from the collector of transistor 444. Therefore, when a receive signal is detected by the voice switch circuit, transistor 514 (FIG. 2) is turned on and no loss is produced in the receive variolosser. The collector of transistor 444 is also connected through resistor 446 to the base of transistor 448 which inverts the RVL control signal. Resistor 447 ensures that transistor 448 is off when there is no receive signal. Resistor 449 provides a path from the collector of transistor 448 to ground. The TVL lead control voltage which is applied to the gate of transistor 609 (FIG. 2), is taken from the collector of transistor 448. Therefore, the variolosser control voltages will be of opposite polarity so that the TVL lead will be high (transmit mode) when the RVL lead is low and vice versa.

Quiet switch 445 is normally open and performs the quieting function when opened by locking the variolossers in the receive mode; i.e., transistor 514 on, transistor 609 off. This places high loss in the transmit variolosser and allows transmission through the receive variolosser.

BATTERY FEED CIRCUIT CONTROL

As shown in FIG. 4, transistor 803 acts as a switch to disconnect the 9 V battery load when the speakerphone circuit is inactive. Base current to turn 803 on is provided through resistor 804 by transistor 805 which is controlled through resistor 806 by the voltage ($V_L$) across capacitor 509 (FIG. 2) of receive variolosser 50 due to line termination.

Resistors 802 and 807 ensure that transistors 803 and 805, respectively, are off when there is no connection to the telephone line.

Capacitor 808 provides filtering for the battery voltage applied to the cicuits. A voltage divider formed by resistors 809 and 810 determines the circuit ground for the voice switch circuits. Transistor 811 and resistor 812 form an emitter-follower which together with capacitor 813 maintains a constant voltage difference between the voice switch circuit ground and the negative battery terminal for variations in ground current. Voltage Va is a mid supply reference voltage.

Battery 801 is used to provide power for the voice switch. If this battery were also to be used for powering the loudspeaker, then the current drain would be of such a magnitude that battery life would be reduced by a factor of approximately 10 thereby making it necessary to constantly change batteries in the unit. It is theoretically possible to eliminate the 9 V battery and to power the voice switch from line voltage. However, since line voltage is low and constantly changing, the circuitry required to achieve the necessary linearity over the full voltage range is expensive.

While the inventive concept has been discussed in terms of communication to and from a central office, it is of course understood that such communication may be over any communication line where power, in the form of talking battery, is provided. An example of such a situation could be an intercom line. The loudspeaker shown is of the electro-mechanical type which operates to convert electrical signals to audio signals. However, the concept discussed herein contemplates other types of terminating transducers for speech, video or data, and in digital as well as analog form.

I claim:

1. A line terminating circuit for connection to a communication line, said circuit comprising
   a power amplifier having input and output stages characterized in that
   said input stage includes biasing components, and wherein said output stage includes a resistive component,
   means for communicating signals received from said communication line via said input stage to said output stage,
   means for providing DC power to said amplifier, said power being received over said communication line, said means arranged to reflect onto said communication line said resistive component of said output stage, said reflection being scaled by said biasing components,
   a transducer operable for converting signals received from said output stage from one form to a second form, said transducer having an impedance comprised in part of said resistive component and wherein said impedance is connected to said output stage as the output impedance of said output stage, and
   means connected between said amplifier output and input stages for establishing a DC gain of unity and for providing AC gain sufficient to enable said transducer to convert said signals.

2. The invention set forth in claim 1 wherein said amplifier input stage is a transistor differential stage, said amplifier output stage including a transistor arranged in a common emitter configuration.

3. The invention set forth in claim 2 wherein said transducer is a loudspeaker (LS1) driven by an inductive coil and wherein said transducer impedance includes the impedance of said inductive coil.

4. A loudspeaking telephone for connection to a communication line, said telephone characterized in that there is included
   a power amplifier having a differential input stage for communicating electrical signals to and from said communication line, including biasing elements, a single-ended output stage, and an emitter follower intermediate stage connected between said input stage and said single-ended output stage, wherein said output stage includes a transistor arranged in a common emitter configuration,
   a loudspeaker for converting electrical signals received from said output stage to audio signals, said loudspeaker having an impedance, comprised in part of a D.C. resistance component, connected directly as the load impedance to said single-ended output stage,
   a line terminating circuit for connection to said communication line, said terminating circuit arranged to provide DC power to said amplifier, said power being received over said communication line, said terminating circuit further arranged to reflect onto said communication line said DC load resistance, said reflection being scaled by said biasing elements of said amplifier input stage, and
   circuitry connected between said amplifier output and input stages for controlling the AC and DC gain of said amplifier.

5. The invention set forth in claim 4 wherein said DC gain is unity and wherein said biasing elements include resistors R1 and R2 and said reflected loading resistance is scaled by the formula $1+R1/R2$.

6. A transformerless line terminating circuit having an input for connection to a communication line said circuit comprising a power amplifier having an input stage including biasing means, an output stage, an intermediate stage for communicating signals from said communication line via said input stage to said output stage, a transducer for converting said signals received over said communication line, said transducer being connected to said power amplifier to provide the load impedance to the output stage thereof, and means for providing D.C. power to said amplifier, said D.C. power being received over said communication line, said means being arranged to reflect onto said input said load impedance, said reflection being scaled by said biasing means.

7. The invention set forth in claim 6 comprising means connected between said amplifier output and input stages for establishing a D.C. gain of unity and for providing AC gain sufficient to drive said transducer.

8. The invention set forth in claim 7 wherein said input stage is a differential amplifier input stage including said biasing means, said intermediate stage is an emitter follower and said output stage is a single-ended output stage, wherein said output stage includes a transistor arranged in common-emitter configuration.

9. The invention set forth in claim 8 wherein said transducer is coupled to a collector electrode of said transistor via diode means.

* * * * *